US011395239B2

(12) United States Patent
Bhupatiraju et al.

(10) Patent No.: US 11,395,239 B2
(45) Date of Patent: Jul. 19, 2022

(54) RADIO FREQUENCY POWER ADAPTATION FOR HANDHELD WIRELESS DEVICES

(71) Applicant: NVIDIA Corporation, Santa Clara, CA (US)

(72) Inventors: Srirama Murthy Raju Bhupatiraju, San Jose, CA (US); Joselito Gavilan, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 96 days.

(21) Appl. No.: 17/119,834

(22) Filed: Dec. 11, 2020

(65) Prior Publication Data

US 2022/0191807 A1 Jun. 16, 2022

(51) Int. Cl.
*H04W 52/28* (2009.01)
*H04W 52/24* (2009.01)

(52) U.S. Cl.
CPC ....... *H04W 52/288* (2013.01); *H04W 52/245* (2013.01)

(58) Field of Classification Search
CPC .......................... H04W 52/288; H04W 52/245
See application file for complete search history.

(56) References Cited

U.S. PATENT DOCUMENTS

| 2011/0117973 | A1* | 5/2011 | Asrani | H04W 52/245 |
| | | | | 455/571 |
| 2015/0261366 | A1* | 9/2015 | Wong | G06F 3/04883 |
| | | | | 345/173 |
| 2017/0285844 | A1* | 10/2017 | Park | G06F 1/1652 |
| 2018/0342794 | A1* | 11/2018 | Han | H04B 1/401 |
| 2020/0374386 | A1* | 11/2020 | Xu | G06F 1/1694 |
| 2021/0381960 | A1* | 12/2021 | Na | G01N 21/27 |

\* cited by examiner

*Primary Examiner* — Dominic E Rego
(74) *Attorney, Agent, or Firm* — Shook, Hardy & Bacon L.L.P.

(57) ABSTRACT

In various examples, radio frequency conducted power of a device—such as a human interface device (HID)—may be adjusted to account for various operating conditions. For example, when a user holds the device in their hand, the radiated power level of the device may be reduced to a level that reduces transmission performance of the device. To account for this, one or more detection mechanisms may be used to determine whether the device is held in hand and, when determined to be held in hand, the radio frequency conducted power of the device may be increased—while complying with regulatory requirements governing wireless transmissions—to increase the performance of the device. When not held in hand, the radio frequency conducted power may be less, thereby resulting in consistent performance of the device under varying operating conditions.

20 Claims, 6 Drawing Sheets

RADIO FREQUENCY POWER ADAPTATION FOR HANDHELD WIRELESS DEVICES

BACKGROUND

Wireless human interface devices (HIDs)—such as, e.g., game controllers, remotes, mice, augmented reality devices, virtual reality devices, mixed reality devices, and pointers—are widely used for interaction with or control of various applications. In order to communicate a signal effectively to a client device communicatively coupled to the HID, the HID should generate enough transmit power (e.g., radio frequency conducted power) to ensure that the signal is received. However, regulatory requirements—such as those corresponding to the effective isotropic radiated power (EIRP) of a device, as governed by agencies such as the Federal Communications Commission (FCC)—place limits on a maximum radiated power allowed for various communication protocols. For non-limiting examples, the FCC allows a maximum EIRP of 10 dBm for Bluetooth communications and a maximum EIRP of 36 dBm for the 2.4 GHz band of wireless fidelity (Wi-Fi) communications.

The EIRP is computed using conducted power of the device and peak gain—e.g., EIRP=conducted power+peak gain. As a result, the conducted power of the device is often required to be below the EIRP maximum such that the EIRP—when factoring in peak gain—does not exceed these regulatory requirements. When held in hand, though, a device may have a negative (or less positive than when in a free space operating condition) peak gain, so the already decreased EIRP due to decreased conducted power may be further decreased as a result of the negative peak gain. As an example, a Bluetooth device may have a measured free space peak gain of 3 dBi, so the maximum conducted power may be 7 dBm or less to comply with the 10 dBm EIRP requirement. However, when held in hand, the Bluetooth device may have a peak gain of −1 dBi, thus resulting in an EIRP of 6 dBm that, while well below the 10 dBm EIRP requirement of the FCC, may prove inadequate for successful communications between the Bluetooth device and a communicatively coupled client device. As such, when held in hand, signals may be lost and the performance of the Bluetooth device may suffer—thereby negatively impacting the user experience.

SUMMARY

Embodiments of the present disclosure relate to radio frequency power adaptation for handheld wireless devices. Systems and methods are disclosed that account for negative (or less positive than compared to a free space operating condition) peak gain of human interface devices (HIDs) by increasing transmit power (e.g., radio frequency conducted power) when the HID is held in hand without exceeding regulatory requirements. For example, and in contrast to conventional systems, the radio frequency conducted power may be increased when it has been reliably detected that the HID is in hand. As a result, the radio frequency conducted power of the HID may be variable such that the radio frequency conducted power is greater when the HID is held in hand and less when the device is not held in hand. Using variable radio frequency conducted power may result in an EIRP that is closer to the maximum EIRP defined by regulatory requirements in various scenarios—e.g., HID held in one hand, HID held in two hands, HID not held, etc.—such that performance of the HID (e.g., signal range and latency) is consistent regardless of the operating conditions.

To determine an operating condition of an HID—e.g., whether the HID is held in hand or not—various detection sources may be used. For example, software detection sources, hardware detection sources, or a combination thereof may be used. In some instances, a single detection source may be used to determine that the HID is currently in hand, while in other instances two or more detections sources—e.g., one hardware one software, two hardware, two software, etc.—may be used for redundancy and to increase the accuracy of the operating condition determination. In some embodiments, signal strength may be measured (e.g., using a received signal strength indicator (RSSI)) at the receiving client device, and the signal strength measurement may be used in a feedback loop with the HID to determine whether conducted power should be increased. As such, in some situations, the radio frequency conducted power may not be increased when the HID is held in hand if the signal strength is above a threshold value that indicates acceptable performance. In other instances, however, the signal strength measurement may aid in determining an amount of increase to the radio frequency conducted power while maintaining an EIRP in compliance with regulatory requirements. Further, in embodiments, a calibration process may be executed between the HID and a communicatively coupled client device to determine—in view of an operating environment of the HID (e.g., a room, building, outdoor space, etc.)—variable radio frequency conducted power levels for various operation conditions (e.g., in one hand, in two hands, on lap, not held, etc.).

BRIEF DESCRIPTION OF THE DRAWINGS

The present systems and methods for radio frequency power adaptation for handheld wireless devices are described in detail below with reference to the attached drawing figures, wherein.

DETAILED DESCRIPTION

Systems and methods are disclosed related to radio frequency power adaptation for handheld wireless devices. Although the present disclosure is described primarily with respect to wireless human interface devices (HIDs)—such as, without limitation, a game controller, a remote control, a computer mouse, a keyboard, a game pad, a joystick, a virtual reality (VR) device, an augmented reality (AR) device, a mixed reality (MR) device, or a barcode reader— this is not intended to be limiting. For example, the systems and methods of the present disclosure may also be suitable for use with, without limitation, an image scanner, a camera (e.g., webcam, digital camera, etc.), a light pen, a steering wheel, a scanner, a smartphone, a tablet computer, and/or other types of peripheral devices, HID devices, and/or handheld devices. In addition, although the present disclosure is described primarily with respect to Bluetooth or wireless fidelity (Wi-Fi) communication protocols, this is not intended to be limiting. For example, any type of wireless communication protocol may be used, such as, without limitation, infrared communication protocols, near field communication protocols, low power wide area network (LPWAN) communication protocols, Zigbee communication protocols, ultraband communication protocols, cellular communication protocols, and/or other wireless communication protocol types. Further, although wireless communication devices are described herein, the devices may additionally include wired communications, in embodiments. Additionally, although effective isotropic radiated power (EIRP) as regulated by the Federal Communications Commission (FCC) is primarily described herein, this is not intended to be limiting. For example, measurements in addition to or alternatively from EIRP (e.g., specific absorption rate (SAR)) and governing bodies in addition to or alternatively from the FCC (e.g., the Body of European Regulators for Electronic Communications (BEREC)) may are contemplated within the scope of the present disclosure.

Figure 1:
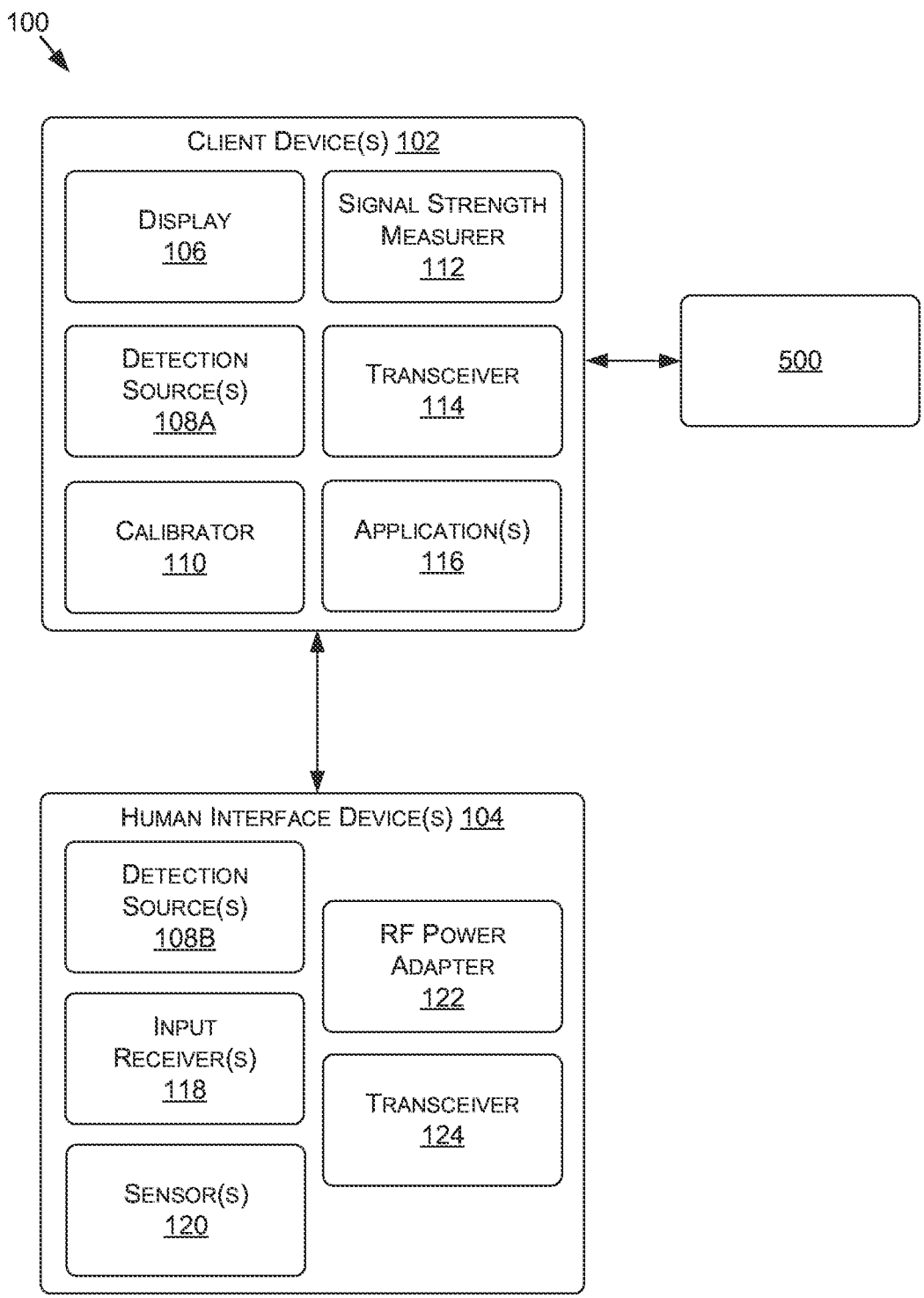
FIG. 1 is a block diagram of a radio frequency power adaptation system, in accordance with some embodiments of the present disclosure.

With reference to FIG. 1, FIG. 1 is a block diagram of a radio frequency power adaptation system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems and methods described herein may be implemented in local computing systems, cloud computing systems, or a combination thereof. For example, in some embodiments, the components, features, and/or functionality described herein with respect to the system 100 of FIG. 1 may be similar to those described with respect to example computing device 400 of FIG. 4 and/or example data center 500 of FIG. 5.

The system 100 may include one or more client devices 102 and/or one or more human interface devices (HIDs) 104. In some embodiments, the client device(s) 102 may communicate with a data center 500—described in more detail herein with respect to FIG. 5—such as where the client device(s) 102 is executing a cloud based application(s) 116 (e.g., a cloud game streaming application, a cloud content streaming application, a cloud video conferencing application, etc.). The client device(s) 102 may include, without limitation, one or more of the types of computing devices described with respect to example computing device 400 of FIG. 4, example data center 500 of FIG. 5, and/or other computing device types. For example, the client device(s) 102 may include a laptop computer, desktop computer, display device, game console, VR system, AR system, mixed reality system, streaming device, tablet computer, smartphone, another computing device type, or a combination thereof.

The client device(s) 102 may include a display(s) 106. For example, the display 106 may include similar components, features, and/or functionality as presentation component(s) 418 of FIG. 4. In some embodiments, the display 106 may include a touchscreen display, in embodiments, and may correspond to a HID 104 of the system 100 (e.g., where the client device 102 is a smartphone or tablet computer and the HID 104 is the display 106). The display 106 may be an integrated component of the client device 102, or may be connected—via a wired and/or wireless connection—to the client device 102. The display 106 may display an application 116 being executed by the client device(s) 102 and controlled or interacted with using the HID(s) 104. In addition, in embodiments where a calibration process is executed using the calibrator 110, the display 106 may include visual prompts or information about the configuration process to aid a user(s) in configuring radio frequency conducted power settings of the system 100.

Figure 4:
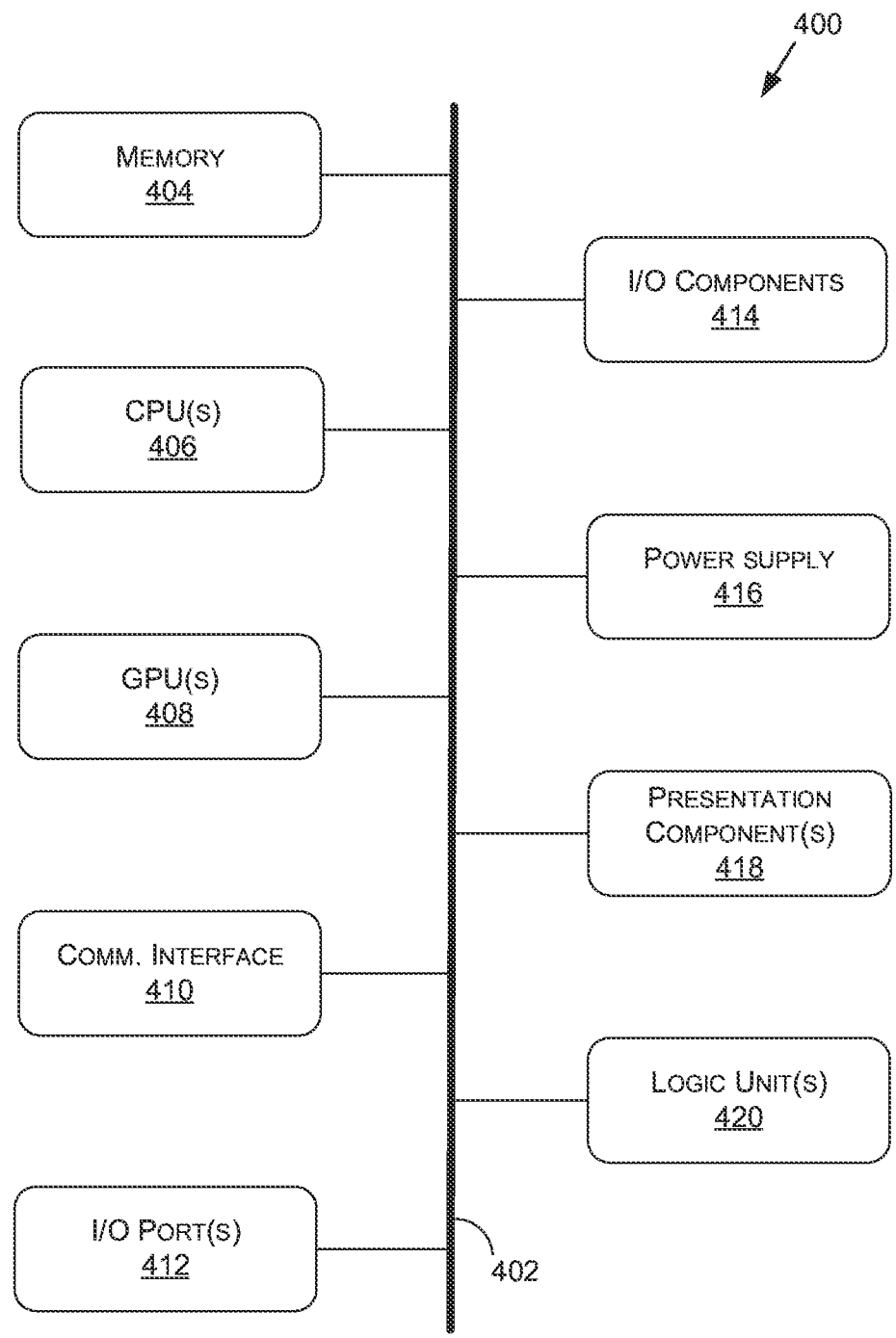
FIG. 4 is a block diagram of an example computing device suitable for use in implementing some embodiments of the present disclosure.

The HID(s) 104 may include, without limitation, one or more of input/output (I/O) components 414 of FIG. 4, one or more other HID device types, one or more peripheral device types, and/or one or more other device types such as, but not limited to, those described herein. For example, the HID(s) 104 may include a computer mouse, a keyboard, a controller, a game pad, a joystick, a remote, a microphone, a track pad, a virtual reality (VR) headset, an augmented reality (AR) headset or eyewear, a mixed reality (MR) headset or eyewear, a barcode reader, a camera (e.g., webcam, digital camera, etc.), a light pen, a steering wheel, another types of peripheral, HID, or other device, or a combination thereof.

The HID(s) 104 may include one or more input receiver(s) 118, which may include a button (such as a mouse button, a keyboard button, a remote control button, a game controller button, etc.), a display (such as a touch screen), a track pad, a motion determining device (e.g., an inertial measurement unit (IMU) sensor (e.g., included within sensors 120) and/or another type of component, feature, and/or functionality for measuring rotation and/or translation of the HID(s) 104—e.g., to measure movement of a mouse, a joystick, control pad, controller, etc.), and/or another type of input receiver(s) 118. As such, the input receiver(s) 118 may receive an input and generate data that represents the input, and this data may be included in a signal(s) transmitted to the client device(s) 102—e.g., using transceiver 124 and/or transceiver 114 (each of which may include a transmitter, a receiver, a transceiver, or a combination thereof)—at a radio frequency conducted power as set using radio frequency (RF) power adapter 122.

The RF power adapter 122 may use data from one or more detection sources 108 (e.g., detection sources 108B of the HID(s) 104 and/or detection sources 108B of the client device(s) 102) to determine a setting for transmit power—or radio frequency conducted power—of the HID(s) 104. For example, the detection sources 108 may include hardware detection sources, software detection sources, or a combination thereof. The detection sources 108 may include sources for determining an operating condition of the HID(s) 104—such as whether the HID(s) 104 is held in hand, not held in hand, held in one hand, held in two hands, on a user's lap, etc. For example, because certain operation conditions of the HID(s) 104—such as the HID(s) 104 being held in hand—may attenuate signals generated by the HID(s) 104, the RF power adapter 122 may increase the radio frequency conducted power (and thus the transmit power) of the HID(s) 104 to account for or counteract the attenuation. The attenuation, in embodiments, may be measured using a peak gain measurement.

Due to regulatory requirements of various communications regulating bodies—such as the FCC or the BEREC—a maximum transmit or radiated power of a device (such as the HID(s) 104) may be limited. For example, these regulating bodies may set signal strength or power maximums corresponding to various communication protocols. In some examples, a maximum EIRP may be regulated for devices. As non-limiting examples, the FCC allows a maximum EIRP of 10 dBm for Bluetooth communications and a maximum EIRP of 36 dBm for the 2.4 GHz band of wireless fidelity (Wi-Fi) communications. EIRP is computed (on a logarithmic scale) using conducted power of the device and peak gain—e.g., EIRP=conducted power+peak gain. A linear scale may be alternatively used for EIRP measurements, in embodiments.

Figure 2A:
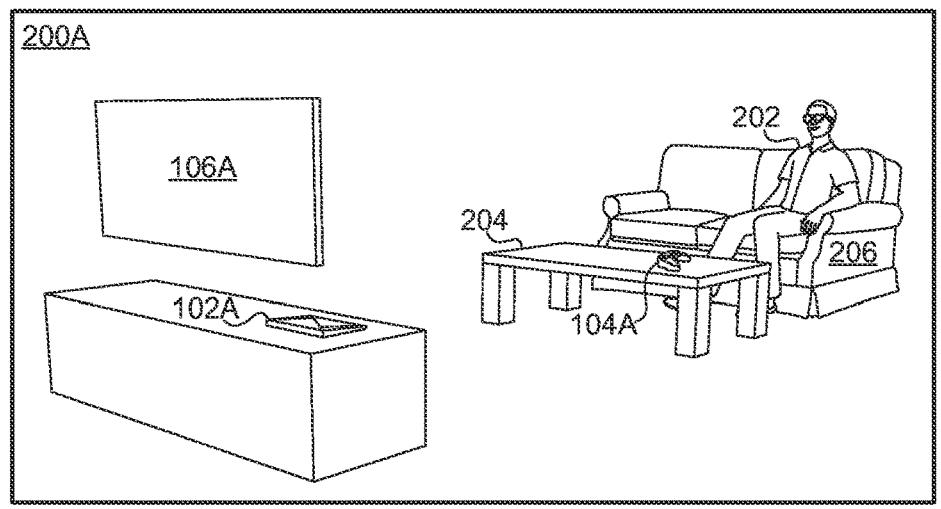
FIGS. 2A-2C depict example illustrations of various operating conditions of a human interface device (HID) within an operating environment, in accordance with some embodiments of the present disclosure.
Figure 2B:
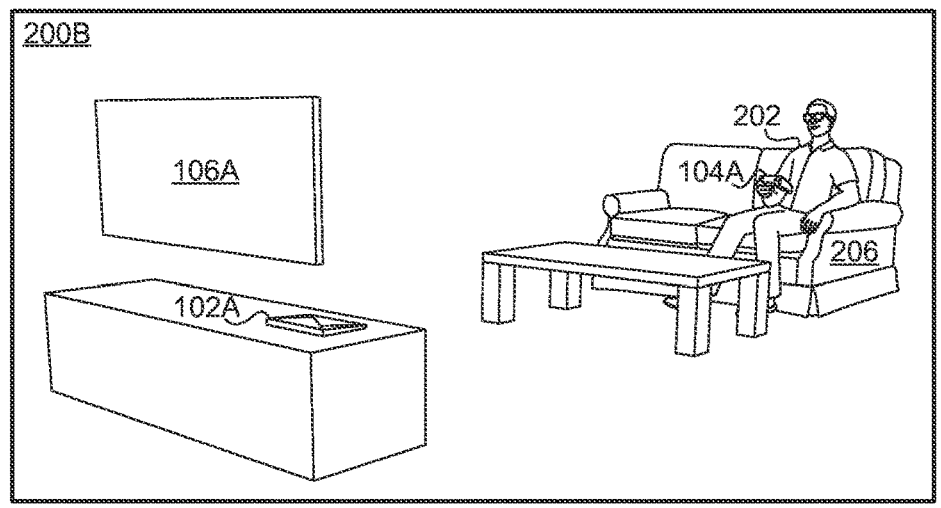
Figure 2C:
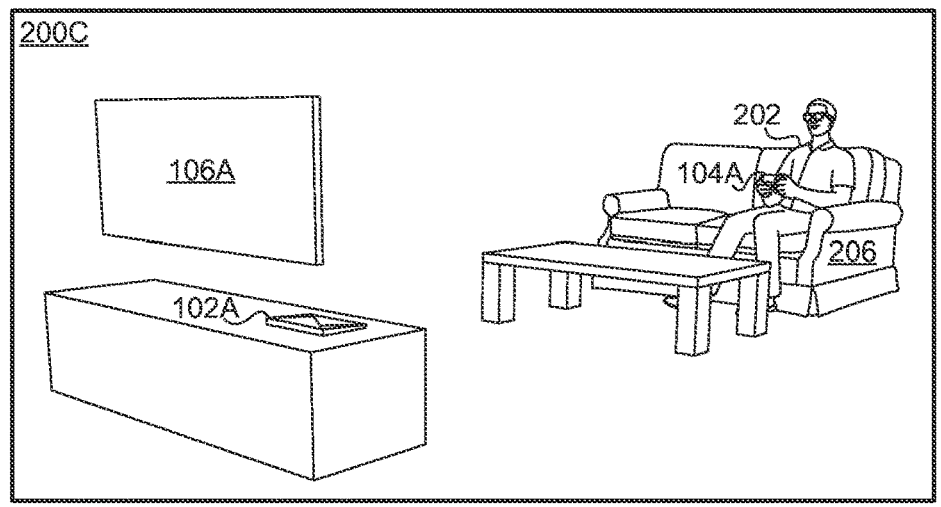

As an example, and with reference to FIGS. 2A-2C, where the HID 104 includes a game controller 104A and the client device 102 includes a content (or game) streaming device 102A, the game controller 104A may wirelessly transmit signals to the content streaming device 102A over Bluetooth (as a non-limiting example). It may be known from testing and/or calibration, that the peak gain of the game controller 104A in free space (visualization 200A of FIG. 2A) is 3 dBi, the peak gain of the game controller 104A when held in one hand (visualization 200B of FIG. 2B) is −1 dBi, and the peak gain of the game controller 104A when held in two hands (visualization 200C of FIG. 2C) is −2 dBi. As such, to comply with the maximum EIRP of 10 dBm as regulated for Bluetooth by the FCC, the radio frequency conducted power of the game controller 104A should not exceed 7 dBm when in free space. However, if 7 dBm were a fixed setting for the radio frequency conducted power of the game controller 104A—as is the case in conventional systems—the EIRP would be 6 dBm when held in one hand and 5 dBm when held in two hands. As a result, although compliance with the maximum regulated EIRP values would be maintained for each setting, the performance of the game controller 104A—e.g., as measured by latency, missed or dropped signals, etc.—may be decreased, thereby reducing the experience of the user 202 when participating in, viewing, or controlling an application 116 (such as a cloud game streaming application).

To account for this potential decrease in performance of the game controller 104A, the RF power adapter 122 may analyze data from one or more detection sources 108 to determine an operating condition of the game controller 104A—e.g., whether the game controller 104A is currently in free space, held in hand, held in one hand, held in two hands, etc. The operating condition determination may be used to determine a radio frequency conducted power for the game controller 104A that accounts for the negative peak gain while also complying with the maximum EIRP (or other regulatory requirements) as set by the FCC. For example, when the operating condition indicates that the game controller 104A is held in one hand, the radio frequency conducted power may be increased to 10 dBm (equating to an EIRP of 9 dBm), 11 dBm (equating to an EIRP of 10 dBm), or another increased value relative to the free space radio frequency conducted power value. Similarly, when the operating condition indicates that the game controller 104A is held in two hands, the radio frequency conducted power may be increased to 10 dBm (equating to an EIRP of 8 dBm), 12 dBm (equating to an EIRP of 10 dBm), or another increased value relative to the free space radio frequency conducted power value (and increased relative to the one hand radio frequency conducted power value, in embodiments). As a result, the performance of the game controller 104A may be increased for each of a variety of operating conditions—e.g., the latency of communications between the content streaming device 102A and the game controller 104A as well as the frequency of missed or dropped signals may be decreased.

The operating condition determination may take place continuously (e.g., when the HID(s) 104 and/or the client device(s) 102 are not in a sleep, low power, or power off mode), at an interval (e.g., multiple times per second, once per second, once every three seconds, once every minute, etc.), in response to inputs (e.g., receive an input, determine operating condition, transmit input data at determined power level), periodically (e.g., at device startup, at certain times of day, etc.), and/or based on other criteria. As such, the operating condition determination may take place in the background, in embodiments, such that when an input is received or other data is generated by the HID(s) 104 for transmission to the client device(s) 102, the data may be transmitted to the client device(s) 102 according to or at the radio frequency conducted power for the determined operating condition.

To determine a current operating condition of the HID(s) 104, various detection sources 108 may be used. In some embodiments, an indication from a single detection source 108 may be used to identify an operating condition—e.g., if a single hardware detection source or a single software detection source indicate the HID(s) 104 is held in hand, the determination may be that the HID(s) 104 is held in hand. In other embodiments, for redundancy and to increase accuracy of operating condition determinations, two or more detection sources 108 may be required to indicate—at a given iteration—that the HID(s) 104 is held in hand prior to a determination that the HID(s) 104 is held in hand. Including redundancy may also aid in reducing or eliminating instances of increasing radio frequency conducted power due to a false positive determination of an operating condition (e.g., held in hand) that may result in an EIRP over the maximum EIRP for the given communication protocol. For example, and with reference to FIG. 2A, where the game controller 104A is moved across a table 204, one or more hardware sensors 120 may generate an indication that the game controller 104A is held in hand (e.g., because movement of the game controller 104A may indicate the game controller 104A is in hand). However, the game controller 104A may have only been moved, but may not be in hand, so have a redundant mechanism—such as a software detection source including detecting gameplay at the content streaming device 102A, detecting button press data at the content streaming device 102A and/or the game controller 104A, etc.—may result in the determination that the game controller 104A is not held in hand, and is actually in a free space operating condition. As such, the determination may be to set or keep the radio frequency conducted power at a level corresponding to the free space operating condition.

The software detection sources 108 may include detecting, at the client device(s) 102, that the application 116 is being interacted with. For example, where a user is playing a game, interactions with the game as detected at the client device(s) 102 may indicate that the HID(s) 104 is held in hand. As such, once the determination is made, the client device(s) 102 may communicate this determination to the HID(s) 104.

Another software detection source 108 may include detecting data representative of button presses. The data may be generated and analyzed at the HID(s) 104 and/or the client device(s) 102 to determine the operating condition of the HID(s) 104—e.g., that the HID(s) 104 is held in hand. Where the client device(s) 102 makes the determination, the client device(s) 102 may communicate this determination to the HID(s) 104. In some examples, such as where the detection of inputs to the input receiver(s) 118 is at the HID(s) 104, this may be considered a hardware detection source 108. For a positive determination that the HID(s) 104 is held in hand, a number, n, of button presses within a time period, t, may be required (where n and t may be configurable for a particular HID(s) 104, a particular application 116, a particular user, a particular operating condition determination, etc.). For example, where a user provides one input to the HID(s) 104 within a two second period, the determination may be that the device is not held in hand (e.g., because the user may have pressed one button on the HID(s) 104 while the HID(s) 104 was in a free space condition), whereas if the user provides three or more inputs within a two second period, the determination may be that the HID(s) 104 is held in hand. In some embodiments, the location of the input receivers 118 may aid in determining the operating condition. For example, in addition to or alternatively from the determination of the number of inputs over the time period, the location of the inputs may be used to determine the operating condition. With respect to FIGS. 2B-2C, for example, when the data representative of the inputs indicates that the user 202 is only providing inputs to the buttons on the right hand side of the game controller 104A, the determination may be that—if held in hand—the HID(s) 104 is held in only one hand (FIG. 2B). Similarly, when the data representative of the inputs indicates that the user 202 is providing inputs to the buttons on the right hand side and the left hand side of the game controller 104A, the determination may be that—if held in hand—the HID(s) 104 is held in two hands (FIG. 2C).

As another example of a software detection source 108, where the client device(s) 102 is in a sleep mode, or low power mode, an indication of the sleep or lower power mode may be transmitted to the HID(s) 104. As such, so long as the client device(s) 102 is in a low power mode, this software detection source 108 may indicate a free space operating condition as increasing the conducted power of the HID(s) 104 may not be required or desired where the client device(s) 102 is not awake.

A hardware detection source 108 may be based off of data generated using sensors 120 of the HID(s) 104. For example, one or more inertial measurement unit (IMU) type sensors—such as an accelerometer, a gyroscope, a magnetometer, etc.—may be used to determine an operating condition of the HID(s) 104. For example, threshold acceleration values for the accelerometer, threshold rotation values for the gyroscope, threshold changes to a magnetic field for the magnetometer, and/or other threshold values for other sensor types may be used as indications of an operating condition of the HID(s) 104. For example, where the HID(s) 104 is not moving—e.g., rotationally, translationally, etc.—the sensors 120 may generate data indicating the same, and this data may be analyzed to determine that—for these detection sources—the HID(s) 104 is not held in hand. While, when the HID(s) 104 is moving, one or more threshold may be used to determine whether the amount or type of movement is indicative of a particular operating condition—such as held in hand.

In some embodiments, the hardware detection sources 108 may rely on other sensor types, such as touch sensors, temperature sensors, pressure sensors, moisture sensors, and/or other sensor types that may indicate whether the HID(s) 104 is currently held in hand—and even more granularly, which hand or how many hands the HID(s) 104 is held in. For example, threshold values for heat, pressure, moisture, etc. may be used to determine whether the device is held in hand, held in one hand, held in two hands, on a lap of a user, etc. In some embodiments, various thresholds may correspond to different radio frequency conducted power values. For example, a first temperature threshold (or pressure threshold for pressure sensors, etc.) may be associated with a first negative peak gain and thus a first radio frequency conducted power, while a second temperature threshold may be associated with a second negative peak gain and thus a second radio frequency conducted power, and so on. As such, the RF power adapter 122 may use a determined amount of heat, pressure, moisture, etc. to determine a corresponding setting for the radio frequency conducted power of the HID(s) 104. In some embodiments, the location of the sensor 120 may indicate the operating condition. For example, where a temperature, pressure, or other sensor type on a left hand side of a HID(s) 104—such as a game controller 104A of FIGS. 2A-2C—generates readings above a threshold, but the sensor(s) on the right hand side of the HID(s) 104 do not generate reading above the threshold, the determination may be that the HID(s) 104 is held in one hand. However, where sensors from both sides indicate that the HID(s) 104 is held in hand, the determination may be that the operating condition is held in two hands. As such, the RF power adapter 122 may account for these various operating conditions when setting the radio frequency conducted power of the HID(s) 104.

Another hardware detection source 108 may include a headphone jack, such that when a user plugs headphones into the headphone jack, this input may be recognized and used as a determination that the HID(s) 104 is held in hand. Another hardware detection source 108 may include a microphones—e.g., of the HID(s) 104, the client device 102, etc.—that detects and/or analyzes audio data to determine whether a user is currently using the HID(s) 104 and, if so, what operating condition the HID(s) 104 is in (e.g., where a certain volume level is detected, certain words are spoken, etc., the determination may be that the HID(s) 104 is held in hand). As another example, a camera on the HID(s) 104, the client device(s) 102, the display 106, etc. may generate image data that may be analyzed—e.g., using computer vision, machine learning, artificial intelligence models, etc.—to determine a current operating condition with respect to the HID(s) 104.

In some examples, a calibrator 110—in combination with a signal strength measurer 112, in embodiments—may be used to calibrate the HID(s) 104 for the particular operating environment. For example, a received signal strength indicator (RSSI), as measured by the signal strength measurer 112 at the client device(s) 102 with respect to signals received from the HID(s) 104, may be used to determine a strength of the signals in the given operating environment. As such, where an EIRP of 7 dBm for an HID(s) 104 in a first operating environment may be sufficient (e.g., because the room may be small), an EIRP of 7 dBm in a second operating environment may be insufficient. To account for this, a calibration process may be used to calibrate the radio frequency conducted power levels for the various operating conditions within the particular operating environment. For example, it may be known from testing or experimentation that an RSSI for a good or sufficient Bluetooth connection is some RSSI value (e.g., −55 on a scale of −100 (worst signal strength) to 0 (best signal strength)). As such, when calibrating the HID(s) 104, the RSSI may be measured for each of the varying operating conditions in the operating environment.

As an example, and again with respect to FIGS. 2A-2C, a user 202 may be prompted—e.g., audibly, visually, a combination thereof, etc.—to locate themselves in a location within the environment where the game controller 104A may be used—e.g., the user 202 may sit on the couch 206. The user 202 may be asked to set the game controller 104A on the table 204, as illustrated in FIG. 2A, and to press any button on the game controller 104A (or this process may happen automatically without user input), and the game controller 104A may generate a signal(s) and transmit the signal at a current free space setting for the radio frequency conducted power. The signal(s) may be received at the content streaming device 102A and used to measure the RSSI. Where the RSSI is acceptable, no adjustments may be made to the setting for the radio frequency conducted power of the game controller 104A in the free space operating condition. However, where the RSSI is below an acceptable or optimal level, the radio frequency conducted power setting may be increased—only upwards to a level that is equal to or below the maximum EIRP as regulated by the FCC—until the RSSI is at an acceptable or optimal level. For a non-limiting example, an RSSI value of −50 or better may be known to result in acceptable performance of the game controller 104A when communicating with the client device(s) 102. However, an RSSI value of −20 or better may be known to result in an optimal or desired performance level of the game controller 104A. As such, the radio frequency conducted power of the game controller 104A may be adjusted to increase the performance toward the optimal or desired level while accounting for any regulatory requirements.

Similarly, with respect to FIG. 2B, the user 202 may be prompted to hold the game controller 104A in one hand, and a received signal(s) may be measured at the content streaming device 102A to determine the RSSI. Adjustments may be made to the radio frequency conducted power setting of the game controller 104A for the one hand operating condition until the RSSI is acceptable, desired, or optimal—e.g., without exceeding or otherwise violating the regulatory requirements. With respect to FIG. 2C, the user 202 may be prompted to hold the game controller 104A in two hands, and a received signal(s) may be measured at the content streaming device 102A to determine the RSSI. Adjustments may be made to the radio frequency conducted power setting of the game controller 104A for the two hands operating condition until the RSSI is acceptable, desired, or optimal—e.g., without exceeding or otherwise violating the regulatory requirements.

In some embodiments, the signal strength calibration process may be executed in real-time, or during use of the HID(s) 104, such that the conducted power levels may be adjusted. For example, where the RSSI of received signals is measured by the signal strength measurer 112 to be below some desired or threshold value—e.g., indicating that the HID(s) 104 may be further away from the client device(s) 102 than normal, or the signal is otherwise attenuated more than usual—the RF power adapter 122 may increase (e.g., temporarily, until the RSSI values are back in an acceptable range) the radio frequency conducted power of the HID(s) 104 for the given operating condition (or for each operating condition). Similarly, where the RSSI of the received signals is measured by the signal strength measurer 112 to be above some desired or threshold value, the RF power adapter 122 may decrease the radio frequency conducted power of the HID(s) 104 for the given operating condition (or for each operating condition)—e.g., to conserve battery life.

In some embodiments, and in addition to or alternatively using the signal strength for calibration, the calibrator 110 may determine a frequency or a number of missed or dropped signals between the HID(s) 104 and the client device(s) 102. As such, where the frequency or number of dropped signals is below a threshold, the settings for radio frequency conducted power may be unchanged. However, where the frequency or number or missed or dropped signals are above a threshold, the radio frequency conducted power may be increased while complying with regulatory requirements. This calibration process may be separately executed in each of the various operating conditions, such that the frequency and/or number of missed or dropped signals is evaluated at each operating condition, and this information is used to set the radio frequency conducted power for each different operating condition. In addition, in some embodiments, the evaluation of dropped signals may take place in real-time, or during use of the HID(s) 104, such that, similar to described above, adjustments may be made to the radio frequency conducted power to increase transmission performance or to save battery life.

In some embodiments, the calibrator 110—and the signal strength measurer 112, in embodiments—may be used to determine the peak gain values for various operating conditions. For example, through testing, experimentation, and/or the like, a correlation between signal strength, sensor readings (e.g., certain temperature readings, moisture readings, pressure readings, etc. may have a known, learned, or estimated correspondence with peak gain values), and/or other sources and peak gain values may be known, learned, or estimated for a particular HID(s) 104. As such, using this information, the peak gain for the HID(s) 104 for a particular user (e.g., a one hand peak gain for a first user may be −1 dBi but may be −1.5 dBi for a second user) or within a particular operating environment (e.g., a free space peak gain in one room may be 3 dBi, but may only be 1 dBi in another room) may be determined using the measured signal strength, the sensor readings, etc. For example, the HID(s) 104 may have to be placed within a certain distance from or location relative to the client device(s) 102, and at this distance or location the conversion between measured signal strength (e.g., RSSI) and peak gain may be determined. This conversion may then be used to determine the peak gain values for a particular user when held in one hand, held in two hands, etc., as signals may be received when the HID(s) 104 is in a free space operating condition, in a one hand operating condition, in a two hand operating condition, etc., and these signals may be analyzed to determine the peak gain for the various operating conditions with respect to the particular user and/or operating environment. As an example with respect to sensor readings, where a temperature sensor is used, measured temperature readings for a particular user in various operating conditions may be measured, and the correlations between the readings and the peak gain values may be determined for the particular user. In any example, once the peak gain values are known for the various operating conditions, the radio frequency conducted power levels for the various operating conditions may be determined such that performance is increased while maintaining compliance with regulatory requirements. In some embodiments, the radio frequency conducted power settings determined based on the measured peak gain values for various operating conditions may be associated with a user profile of the user, such that when the user logs into the system 100, the corresponding radio frequency conducted power settings for the user may be implemented.

Figure 3A:
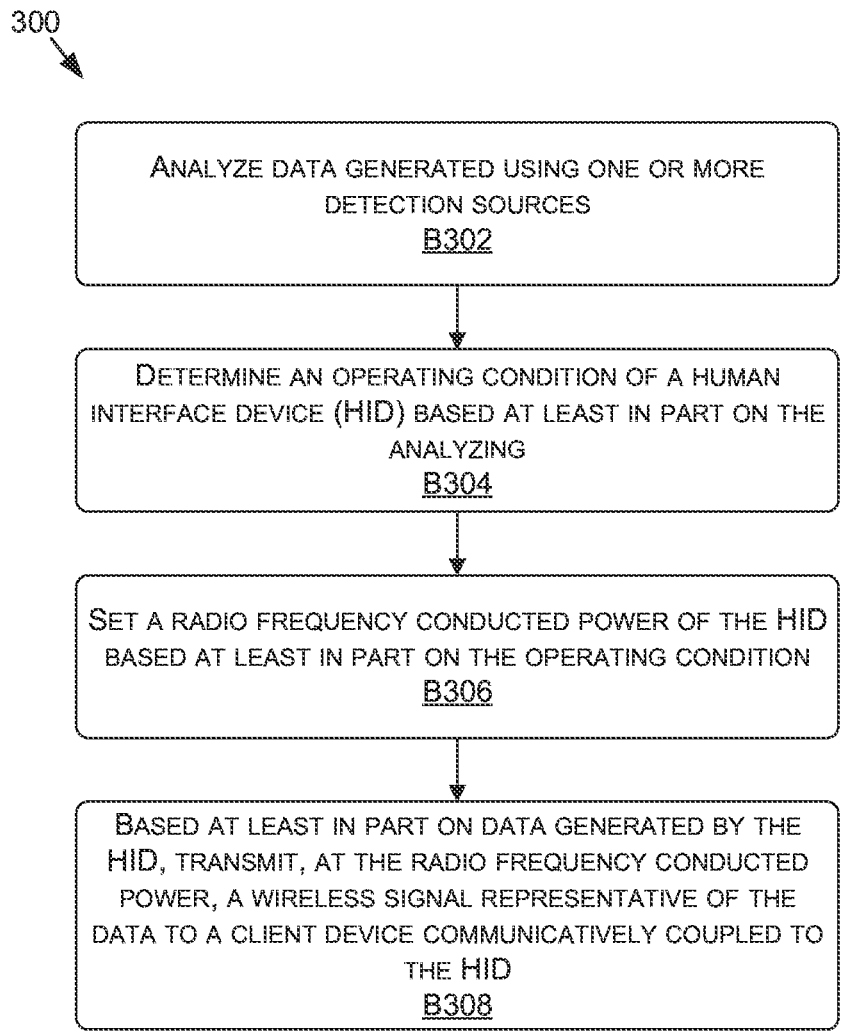
FIGS. 3A-3B are flow diagrams of methods for adapting radio frequency conducted power based on an operating condition of a HID, in accordance with some embodiments of the present disclosure.
Figure 3B:
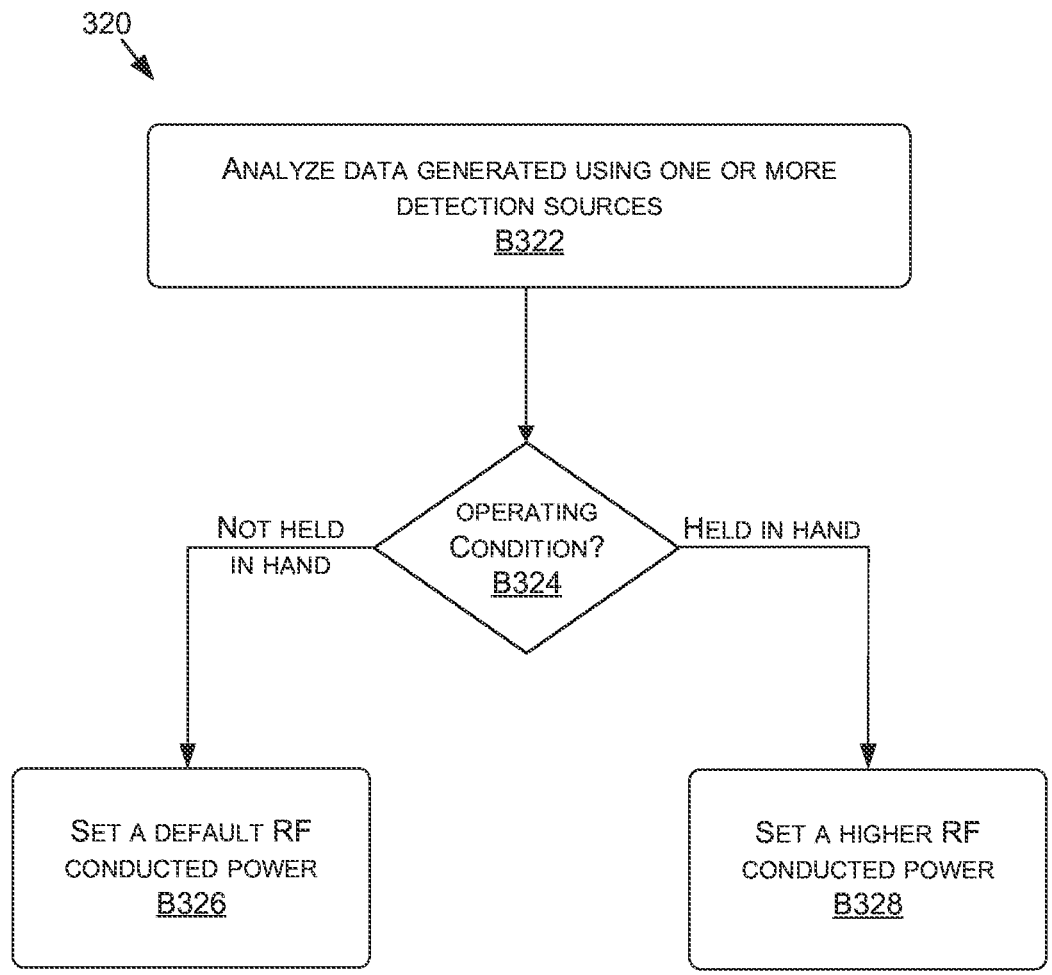

Now referring to FIGS. 3A-3B, each block of methods 300 and 320, described herein, comprises a computing process that may be performed using any combination of hardware, firmware, and/or software. For instance, various functions may be carried out by a processor executing instructions stored in memory. The methods 300 and 320 may also be embodied as computer-usable instructions stored on computer storage media. The methods 300 and 320 may be provided by a standalone application, a service or hosted service (standalone or in combination with another hosted service), or a plug-in to another product, to name a few. In addition, methods 300 and 320 are described, by way of example, with respect to the system 100 of FIG. 1. However, these methods 300 and 320 may additionally or alternatively be executed by any one system, or any combination of systems, including, but not limited to, those described herein.

With reference to FIG. 3A, FIG. 3A is a flow diagram of a method 300 for adapting radio frequency conducted power based on an operating condition of a HID, in accordance with some embodiments of the present disclosure. The method 300, at block B302, includes analyzing data generated using one or more detection sources. For example, data generated by or corresponding to one or more of the detection sources 108 may be analyzed. In some embodiments, two or more detection sources may be used for redundancy and/or to increase the accuracy of the operation condition determination.

The method 300, at block B304, includes determining an operating condition of a human interface device (HID) based at least in part on the analyzing. For example, based on the analyzing the data from the detection source(s) 108, an operating condition of the HID(s) 104—e.g., free space, in hand, in one hand, on lap, etc.—may be determined.

The method 300, at block B306, includes setting a radio frequency conducted power of the HID based at least in part on the operating condition. For example, once the operating condition is determined, the radio frequency conducted power associated with the operating condition for the HID(s) 104 may be set by the RF power adapter 122. The radio frequency conducted power may be greater when the HID(s) 104 is held in hand to account for negative peak gain. In any embodiments, the radio frequency conducted power may be set such that the transmission power of the HID(s) 104 do not violate any regulatory requirements.

The method 300, at block B308, includes, based at least in part on data generated by the HID, transmitting, at the radio frequency conducted power, a wireless signal representative of the data to a client device communicatively coupled to the HID. For example, based on data generated using the input receiver(s) 118, a signal may be generated and transmitted by the HID(s) 104 and to the client device(s) 102 at the radio frequency conducted power level.

Now referring to FIG. 3B, FIG. 3B is a flow diagram of a method 320 for adapting radio frequency conducted power based on an operating condition of a HID, in accordance with some embodiments of the present disclosure. The method 320, at block B322, includes analyzing data generated using one or more detection sources. For example, data generated by or corresponding to one or more of the detection sources 108 may be analyzed.

The method 320, at block B324, includes determining an operating condition. For example, the operating condition indications from one or more detection sources 108 may be analyzed to determine the operating condition for the HID(s) 104.

Where the determination at block B324 is that the HID(s) 104 is not held in hand, the method 320 may proceed to block B326. The method 320, at block B326, includes setting a default (or lower) radio frequency conducted power. For example, when the HID(s) 104 is determined to be in a free space operating condition, the radio frequency conducted power may be at a default setting, or at a lower setting comparatively to any operating conditions indicating the HID(s) 104 is held in hand. In any example, the radio frequency conducted power may be set such that regulatory requirements are complied with.

Where the determination at block B324 is that the HID(s) 104 is held in hand, the method 320 may proceed to block B328. The method 320, at block B328, includes setting a higher radio frequency conducted power. For example, when the HID(s) 104 is held in hand, the peak gain may be negative (or less positive than when in a free space operating condition), and the radio frequency conducted power may be increased to compensate for the reduced peak gain value. In embodiments where a one hand or two hand determination is made, the determination at block B324 may include determining whether the HID(s) 104 is held in one hand or two hands. Where the HID(s) 104 is determined to be held in two hands, the radio frequency conducted power may be increased to a higher level than when held in one hand. In some embodiments, additional operating conditions may be considered at block B324, such as on lap, attached to body (e.g., wrist, arm, leg, torso, etc.), etc. In such embodiments, the radio frequency conducted power may be set based on the determined operating condition. In any example, the radio frequency conducted power may be set such that regulatory requirements are complied with.

Example Computing Device

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420. In at least one embodiment, the computing device(s) 400 may comprise one or more virtual machines (VMs), and/or any of the components thereof may comprise virtual components (e.g., virtual hardware components). For non-limiting examples, one or more of the GPUs 408 may comprise one or more vGPUs, one or more of the CPUs 406 may comprise one or more vCPUs, and/or one or more of the logic units 420 may comprise one or more virtual logic units. As such, a computing device(s) 400 may include discrete components (e.g., a full GPU dedicated to the computing device 400), virtual components (e.g., a portion of a GPU dedicated to the computing device 400), or a combination thereof.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

Example Data Center

Figure 5:
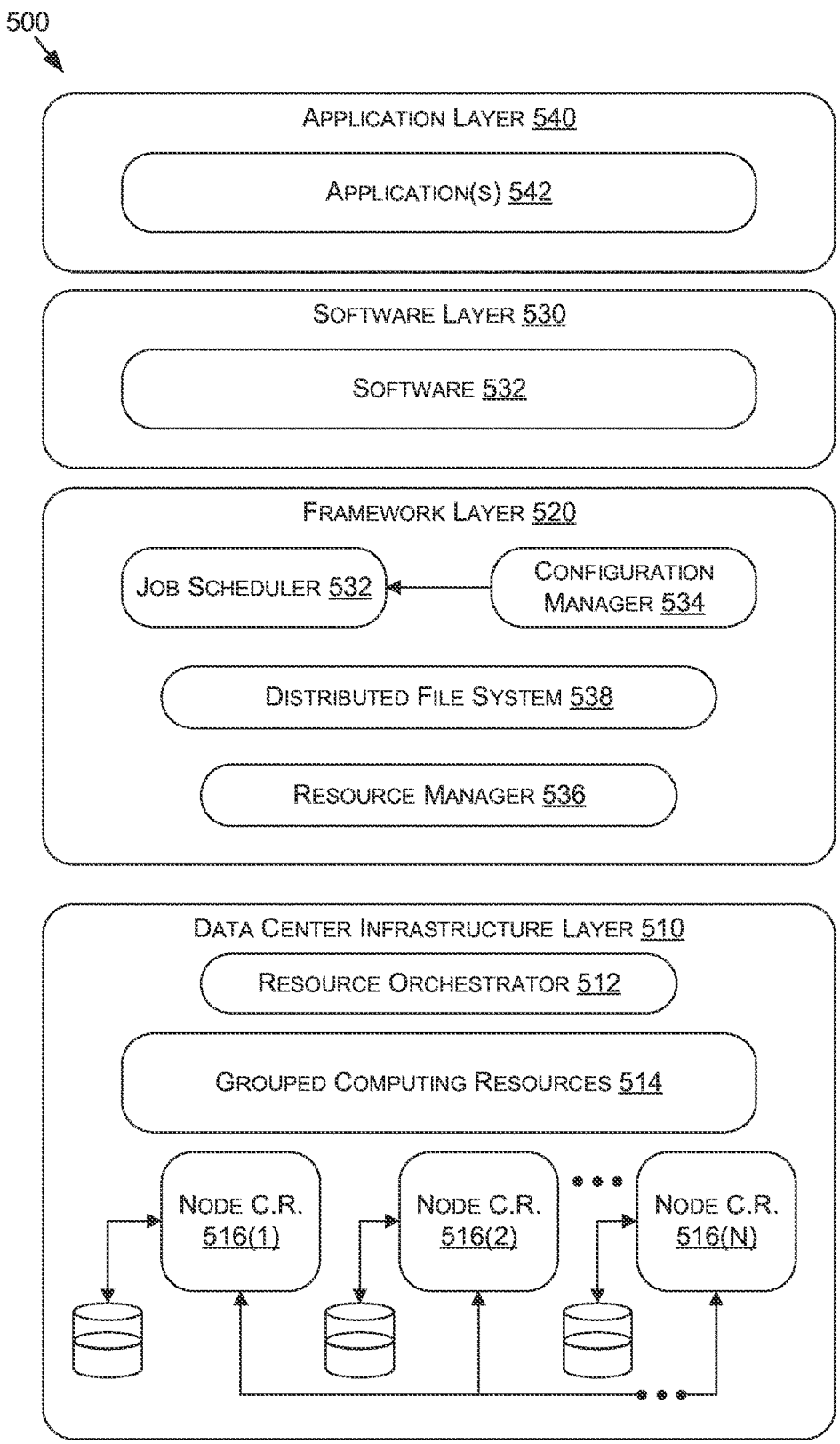
FIG. 5 is a block diagram of an example data center suitable for use in implementing some embodiments of the present disclosure.

FIG. 5 illustrates an example data center 500 that may be used in at least one embodiments of the present disclosure. The data center 500 may include a data center infrastructure layer 510, a framework layer 520, a software layer 530, and/or an application layer 540.

As shown in FIG. 5, the data center infrastructure layer 510 may include a resource orchestrator 512, grouped computing resources 514, and node computing resources ("node C.R.s") 516(1)-516(N), where "N" represents any whole, positive integer. In at least one embodiment, node C.R.s 516(1)-516(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 516(1)-516(N) may correspond to a server having one or more of the above-mentioned computing resources. In addition, in some embodiments, the node C.R.s 516(1)-5161(N) may include one or more virtual components, such as vGPUs, vCPUs, and/or the like, and/or one or more of the node C.R.s 516(1)-516(N) may correspond to a virtual machine (VM).

In at least one embodiment, grouped computing resources 514 may include separate groupings of node C.R.s 516 housed within one or more racks (not shown), or many racks housed in data centers at various geographical locations (also not shown). Separate groupings of node C.R.s 516 within grouped computing resources 514 may include grouped compute, network, memory or storage resources that may be configured or allocated to support one or more workloads. In at least one embodiment, several node C.R.s 516 including CPUs, GPUs, and/or other processors may be grouped within one or more racks to provide compute resources to support one or more workloads. The one or more racks may also include any number of power modules, cooling modules, and/or network switches, in any combination.

The resource orchestrator 522 may configure or otherwise control one or more node C.R.s 516(1)-516(N) and/or grouped computing resources 514. In at least one embodiment, resource orchestrator 522 may include a software design infrastructure ("SDI") management entity for the data center 500. The resource orchestrator 522 may include hardware, software, or some combination thereof.

In at least one embodiment, as shown in FIG. 5, framework layer 520 may include a job scheduler 532, a configuration manager 534, a resource manager 536, and/or a distributed file system 538. The framework layer 520 may include a framework to support software 532 of software layer 530 and/or one or more application(s) 542 of application layer 540. The software 532 or application(s) 542 may respectively include web-based service software or applications, such as those provided by Amazon Web Services, Google Cloud and Microsoft Azure. The framework layer 520 may be, but is not limited to, a type of free and open-source software web application framework such as Apache Spark™ (hereinafter "Spark") that may utilize distributed file system 538 for large-scale data processing (e.g., "big data"). In at least one embodiment, job scheduler 532 may include a Spark driver to facilitate scheduling of workloads supported by various layers of data center 500. The configuration manager 534 may be capable of configuring different layers such as software layer 530 and framework layer 520 including Spark and distributed file system 538 for supporting large-scale data processing. The resource manager 536 may be capable of managing clustered or grouped computing resources mapped to or allocated for support of distributed file system 538 and job scheduler 532. In at least one embodiment, clustered or grouped computing resources may include grouped computing resource 514 at data center infrastructure layer 510. The resource manager 1036 may coordinate with resource orchestrator 512 to manage these mapped or allocated computing resources.

In at least one embodiment, software 532 included in software layer 530 may include software used by at least portions of node C.R.s 516(1)-516(N), grouped computing resources 514, and/or distributed file system 538 of framework layer 520. One or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1)-516(N), grouped computing resources 514, and/or distributed file system 538 of framework layer 520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 534, resource manager 536, and resource orchestrator 512 may implement any number and type of self-modifying actions based on any amount and type of data acquired in any technically feasible fashion. Self-modifying actions may relieve a data center operator of data center 500 from making possibly bad configuration decisions and possibly avoiding underutilized and/or poor performing portions of a data center.

The data center 500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 500. In at least one embodiment, trained or deployed machine learning models corresponding to one or more neural networks may be used to infer or predict information using resources described above with respect to the data center 500 by using weight parameters calculated through one or more training techniques, such as but not limited to those described herein.

In at least one embodiment, the data center 500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 400 of FIG. 4—e.g., each device may include similar components, features, and/or functionality of the computing device(s) 400. In addition, where backend devices (e.g., servers, NAS, etc.) are implemented, the backend devices may be included as part of a data center 500, an example of which is described in more detail herein with respect to FIG. 5.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 400 described herein with respect to FIG. 4. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
analyzing data generated using one or more detection sources;
based at least in part on the analyzing, determining an operating condition of a human interface device (HID), the operating condition corresponding to whether the HID is currently held in hand;
setting a radio frequency conducted power of the HID based at least in part on the operating condition, the radio frequency conducted power being greater when the operating condition indicates that the HID is currently held in hand than when the operating condition indicates that the HID is not currently held in hand; and
based at least in part on a data generated by the HID, transmitting, at the radio frequency conducted power, a wireless signal representative of the data to a client device communicatively coupled to the HID.

2. The method of claim 1, wherein the one or more detection sources include one or more hardware detection sources, one or more software detection sources, or a combination thereof.

3. The method of claim 1, wherein the radio frequency conducted power is greater when the operating condition indicates that the HID is currently held in two hands than when the operating condition indicates that the HID is currently held in one hand.

4. The method of claim 1, wherein the setting the radio frequency conducted power is such that the radio frequency conducted power in combination with peak gain results in an effective isotropic radiated power (EIRP) less than or equal to a maximum EIRP associated with one or more regulatory requirements associated with a communication protocol corresponding to the wireless signal.

5. The method of claim 1, wherein the data is generated by the HID based at least in part on an input to the HID or movement of the HID.

6. The method of claim 1, wherein the radio frequency conducted power for the operating condition indicating that the HID is currently held in hand and the radio frequency conducted power for the operating condition indicating that the HID is not currently held in hand are determined using a calibration process, the calibration process including a signal strength measurement by the client device when receiving signals generated by the HID in the operating condition indicating that the HID is currently held in hand and in the operating condition indicating that the HID is not currently held in hand.

7. The method of claim 1, wherein at least one detection source of the one or more detection sources is evaluated at the client device, and the method further comprises receiving another signal from the client device indicating a determination of the at least one detection source with respect to the operating condition.

8. The method of claim 1, wherein the wireless signal corresponds to at least one of a Bluetooth communication protocol, a wireless fidelity (Wi-Fi) communication protocol, an infrared (IR) communication protocol, a Zigbee communication protocol, a near field communication protocol, an ultraband communication protocol, or a cellular communication protocol.

9. A method comprising:
analyzing data generated using one or more detection sources;
based at least in part on the analyzing, determining that a first device is held in hand;

increasing a radio frequency conducted power of the first device based at least in part on the first device being held in hand; and transmitting, at the increased radio frequency conducted power, a wireless signal representative of the data to a second device communicatively coupled to the first device.

10. The method of claim 9, wherein the one or more detection sources includes two or more detection sources, the two or more detection sources including one or more hardware detection sources, one or more software detection sources, or a combination thereof.

11. The method of claim 9, wherein the determining that the first device is held in hand is at a first time, and the method further comprises:

determining, at a second time different than the first time and based at least in part on additional data generated using the one or more detection sources, that the first device is not held in hand; and setting the radio frequency conducted power of the first device to a decreased radio frequency conducted power less than the increased radio frequency conducted power.

12. The method of claim 9, wherein the increasing the radio frequency conducted power is such that the increased radio frequency conducted power in combination with peak gain results in an effective isotropic radiated power (EIRP) less than or equal to a maximum EIRP associated with one or more regulatory requirements associated with a communication protocol corresponding to the wireless signal.

13. The method of claim 9, wherein at least one detection source of the one or more detection sources is evaluated at the second device, and the method further comprises receiving another signal from the second device indicating a determination of the at least one detection source.

14. The method of claim 9, wherein an amount of increase to the radio frequency conducted power corresponds to an amount of surface area of the first device estimated to be in contact with a user.

15. A system comprising:
one or more processing units;
one or more memory devices storing instructions thereon that, when executed using the one or more processing units, cause the one or more processing units to execute operations comprising:

analyzing data generated using one or more detection sources;

based at least in part on the analyzing, determining an operating condition corresponding to whether a device is currently held in hand;

setting a radio frequency conducted power of the device based at least in part on the operating condition, the radio frequency conducted power being greater when the operating condition indicates that the device is currently held in hand than when the operating condition indicates that the device is not currently held in hand; and based at least in part on a data generated by the device, transmitting, at the radio frequency conducted power, a wireless signal representative of the data to a client device communicatively coupled to the device.

16. The system of claim 15, wherein the one or more detection sources include one or more hardware detection sources, one or more software detection sources, or a combination thereof.

17. The system of claim 15, further comprising one or more inertial measurement unit (IMU) sensors, wherein at least one of the one or more detection sources corresponds to at least one of the one or more IMU sensors.

18. The system of claim 15, wherein the device corresponds to a computer peripheral, a game controller, a remote control, a pointer, a handheld scanner, a keyless entry device, or a smartphone.

19. The system of claim 15, wherein the setting the radio frequency conducted power is such that the radio frequency conducted power in combination with peak gain results in an effective isotropic radiated power (EIRP) less than or equal to a maximum EIRP associated with one or more regulatory requirements associated with a communication protocol corresponding to the wireless signal.

20. The system of claim 15, wherein at least one detection source of the one or more detection sources is evaluated at the client device, and the operations further comprise receiving another signal from the client device indicating a determination of the at least one detection source with respect to the operating condition.

* * * * *